United States Patent
Menzel et al.

(10) Patent No.: US 11,529,682 B2
(45) Date of Patent: Dec. 20, 2022

(54) PRESS DEVICE

(71) Applicant: DORST TECHNOLOGIES GMBH & CO. KG, Kochel am See (DE)

(72) Inventors: Roland Menzel, Kochel am See (DE); Max Hälterlein, Haunshofen (DE); Martin Rossi, Mittenwald (DE)

(73) Assignee: DORST TECHNOLOGIES GMBH & CO. KG, Kochel am See (DE)

(*) Notice: Subject to any disclaimer, the term of this patent is extended or adjusted under 35 U.S.C. 154(b) by 357 days.

(21) Appl. No.: 16/342,361

(22) PCT Filed: Oct. 6, 2017

(86) PCT No.: PCT/EP2017/075438
§ 371 (c)(1),
(2) Date: Apr. 16, 2019

(87) PCT Pub. No.: WO2018/077588
PCT Pub. Date: May 3, 2018

(65) Prior Publication Data
US 2019/0262898 A1 Aug. 29, 2019

(30) Foreign Application Priority Data
Oct. 24, 2016 (DE) ..................... 10 2016 120 195.2

(51) Int. Cl.
*B29C 43/18* (2006.01)
*B22F 3/03* (2006.01)
(Continued)

(52) U.S. Cl.
CPC ................ *B22F 3/03* (2013.01); *B29C 43/58* (2013.01); *B30B 11/005* (2013.01)

(58) Field of Classification Search
CPC ......... B29C 43/04; B29C 43/08; B29C 43/32; B29C 43/36; B29C 43/58; B29C 2043/5825; B29C 2043/5833
See application file for complete search history.

(56) References Cited

U.S. PATENT DOCUMENTS

| | | | |
|---|---|---|---|
| 5,906,837 A | 5/1999 | Link et al. | |
| 6,442,859 B1 | 9/2002 | Hinzpeter et al. | |

(Continued)

FOREIGN PATENT DOCUMENTS

| | | |
|---|---|---|
| CN | 101678627 A | 3/2010 |
| CN | 103660361 A | 3/2014 |

(Continued)

OTHER PUBLICATIONS

German Search Report for corresponding German Patent Application No. 10 2016 120 195.2 dated Jun. 30, 2017, 12 pages.

(Continued)

*Primary Examiner* — Joseph S Del Sole
*Assistant Examiner* — Thu-Khanh T. Nguyen
(74) *Attorney, Agent, or Firm* — Merchant & Gould P.C.

(57) ABSTRACT

A metal-powder and/or ceramic-powder press device includes at least one first punch (11) which, in a pressing position, is arranged to pass from a first side into a die opening, filled with ceramic and/or metal powder, of a die (13). At least one second punch (12), in the pressing position, is arranged to pass from a second side into the die opening, filled with ceramic and/or metal powder, of the die (13). A position measuring device determines a position of the first punch (11) and includes a first measuring element (16) and a second measuring element (19). The first measuring element (16) is connectable to the first punch (11) and the second measuring element (19) is connectable to the second punch (12), such that a relative position of the (Continued)

measuring elements to one another changes during the pressing operation. A sensor device determines the change in the relative position.

19 Claims, 4 Drawing Sheets

(51) Int. Cl.
  *B30B 11/00* (2006.01)
  *B29C 43/58* (2006.01)

(56) References Cited

U.S. PATENT DOCUMENTS

| | | | | |
|---|---|---|---|---|
| 7,255,817 | B2* | 8/2007 | Tazawa | B30B 11/005 264/109 |
| 7,726,961 | B2* | 6/2010 | Baltruschat | B30B 11/005 425/78 |
| 2003/0180408 | A1 | 9/2003 | Hinzpeter et al. | |
| 2010/0007053 | A1* | 1/2010 | Yamaguchi | B30B 11/005 264/299 |

FOREIGN PATENT DOCUMENTS

| | | |
|---|---|---|
| CN | 104786544 A | 7/2015 |
| CN | 204844936 U | 12/2015 |
| DE | 100 11 859 C2 | 5/2002 |
| DE | 102 54 656 B4 | 10/2005 |
| DE | 10 2006 051 666 A1 | 5/2008 |
| DE | 10 2009 004 620 A1 | 7/2010 |
| DE | 10 2010 051 513 A1 | 5/2012 |
| EP | 1 346 821 A2 | 9/2003 |
| JP | H05-138399 A | 6/1993 |
| JP | H08-155694 A | 6/1996 |
| JP | 2001-252798 A | 9/2001 |
| JP | 2006-150362 A | 6/2006 |
| JP | 2011-235349 A | 11/2011 |

OTHER PUBLICATIONS

International Search Report and Written Opinion of the International Searching Authority for corresponding International Patent Application No. PCT/EP2017/075438 dated Dec. 14, 2017, 14 pages.
Chinese Office Action for corresponding Chinese Patent Application No. 201780064081.3 dated Sep. 24, 2020, 21 pages.
Japanese Office Action for JP Application No. 2019-520708 dated Sep. 27, 2021 (7 pages, with English translation).
Chinese Office Action for ON Application No. 201780064081.3 dated Nov. 1, 2021 (13 pages, with English translation).

* cited by examiner

PRESS DEVICE

This application is a National Stage Application of PCT/EP2017/075438, filed 6 Oct. 2017, which claims benefit of Patent Application Serial No. 10 2016 120 195.2, filed 24 Oct. 2016 in Germany and which applications are incorporated herein by reference. To the extent appropriate, a claim of priority is made to each of the above-disclosed applications.

BACKGROUND OF THE INVENTION

The invention relates to a press device, in particular a metal-powder and/or ceramic-powder press device according to claim 1 as well as a method for powder pressing a powder-pressed part, in particular a ceramic-powder pressed part and/or a metal-powder pressed part.

From EP 1 346 821 A2, a displacement measuring system for a powder press with an upper and lower punch is known, wherein the upper and lower punch interact with a die of a die plate and are each actuated by a hydraulic cylinder. Two arms are connected to the upper punch on diametrically opposite sides, which interact with two vertical measuring rulers. The measuring rulers are firmly connected to the die plate. The measuring rulers are used to determine the path of the upper punch relative to the die plate. With the aid of two further measuring arms on the lower punch and two further measuring rulers connected to the underside of the die plate, the path of the lower punch relative to the die plate is also to be determined. Overall, a comparatively high positioning accuracy can be achieved by the method according to EP 1 346 821 A2. However, the method appears comparatively complex and thus susceptible to inaccuracies.

SUMMARY OF THE INVENTION

It is therefore the object of the present invention to propose a press device, in particular a metal-powder and/or ceramic powder press device, in which the position of a press plunger can be determined easily and as precisely as possible.

In particular, the object is solved by a press device, preferably a metal-powder and/or ceramic-powder press device, which comprises at least one first punch (upper punch) which, in a pressing position, is arranged so as to be immersible from a first side into a die opening of a die filled with ceramic and/or metal powder, and at least one second punch (lower punch), which in the pressing position is arranged so as to be immersible from a second side into the die opening of the die, which is filled with ceramic and/or metal powder and a position measuring device for determining (at least) one position of the first punch (or a position of an end of the first punch facing the die), wherein the position measuring device comprises at least one first measuring element, one second measuring element and a sensor device, wherein the first measuring element is connected or connectable to the first punch and the second measuring element is connected or connectable to the second punch so that a relative position of the measuring elements with respect to one another changes during the pressing operation, wherein the sensor device is designed to determine the change in the relative position.

A core idea of the invention lies in the fact that the position is tapped at first (directly) at the punches by the measuring elements (which are correspondingly connected or connectable to the punches), wherein the sensor device determines a relative position of the measuring elements (directly). From this, a position of the first stamp in relation to the second stamp can be easily derived. This makes it easy to determine the exact volume between the first and second punch that is decisive for the shaping of the pressed part so that the press device can be precisely controlled. In accordance with the invention, it was also recognized that when the measuring elements are connected (directly) to the respective punches, the position of the punches (and ultimately of the volume between the punches) can be determined particularly precisely. In particular, the influence of a compression of the press punch (and other parts in the force flow, such as a punch base, a tool carrier and the like) can be minimized. When tapping a position at a punch base, for example, the error from such a compression can be several millimeters (optionally up to 3 mm). This is due to the fact that a compression can only be detected to a limited extent if the position is tapped far away from a surface of the die that ultimately comes into contact with the pressed part. Furthermore, thermal influences can result in a considerable length change of the punch (from approx. 0.1 to 0.2 mm). This is caused in particular by the heat generated at the press punches by friction. These phenomena have been identified as the main cause of difficulties in the production of pressed parts in powder pressing. At present, these phenomena require constant readjustment and setting of the pressed parts, which requires a great deal of time.

According to a further aspect of the invention (which can also be combined with the above aspect), the object is solved in particular by a metal-powder and/or ceramic-powder press device, which has at least one first punch (upper punch), which, in a pressing position, can be immersed from a first side into a die opening of a die filled with ceramic and/or metal powder. Preferably, at least one second punch is provided, which in the pressing position is arranged so as to be immersible from a second side into the die opening of the die filled with ceramic and/or metal powder. Furthermore, a position measuring device for determining (at least) one position of the first punch (or a position of an end of the first punch facing the die or a pressing end face of the punch which comes into contact with the pressed part during pressing), wherein the position measuring device comprises at least one first measuring element and a sensor device for determining the position of the first measuring element (with respect to a reference point).

According to the second aspect, the first measuring element is connected or connectable to the first punch and is or can be arranged at least in sections within the first punch, in particular connected or connectable to an inner wall of the first punch. Alternatively or additionally, a connection point between the punch and the first measuring element is arranged in a front section of the punch (facing the die).

A core idea of the second aspect is that the position within the first punch is tapped. On the one hand, this reduces an error caused by the above-mentioned phenomena. On the other hand, errors are also reduced which occur when the punch is tilted (even if only minimally) or inclined. All in all, a precise determination of the position of the first punch is made possible in a simple way.

A first connection point between the first measuring element and the first punch is preferably located in a half of the first punch facing the die (or the second punch), in particular in a third of the first punch facing the die (the second punch), preferably in a quarter of the first punch facing the die (the second punch), more preferably in a tenth of the first punch facing the die (the second punch). An $n^{th}$ part facing the die (the second punch) is to be understood as a portion of the punch which corresponds in length to an $n^{th}$ fraction of the total length of the punch and comprises the end of the punch which comes into contact with the powder-pressed part. Alternatively or additionally, a second connection point between the second measuring element and the second punch can lie in a half facing the die (or the first punch), in particular in a third of the second punch facing the die (the first punch), preferably in a quarter of the second punch facing the die (the first punch), more preferably in a tenth of the second punch facing the die (the first punch). In general, positioning the measuring element (or a connection point between the measuring element and the corresponding punch) comparatively close to the end of the punch that comes into contact with the pressed part considerably reduces the influence of the above-mentioned phenomena (in particular compression and thermal influences) so that extremely precise measurement can be achieved.

Preferably, the first measuring element is firmly connected to the first punch, in particular soldered and/or screwed to the first punch and/or connected via a clamping device. The second measuring element can be firmly connected to the second punch, especially soldered to the second punch. Preferably, however, the second measuring element is (in principle) movable relative to the second punch, wherein the second measuring element is (temporarily) connected (connectable) to the second punch during the pressing process preferably in a fixed position, in particular due to the interaction via two mutually corresponding stops. In particular, the second element is movable relative to the second punch in such a way that an end of the second measuring element facing the first punch can be moved over a surface of the die facing the first punch (optionally beyond the end surface of a center pin). In any case, a movable second measuring element enables a simple and precise measurement. For example, the second measuring element can be positioned comparatively close to the first measuring element, so that the distance between the first and second measuring elements can be measured comparatively easily (for position and ultimately displacement measurement). Nevertheless, a disturbing influence can be reduced by moving the movable second measuring element out of a filling area again (above the die, for example). In particular, the second measuring element can therefore be moved downwards when the powder is filled and upwards when pressing (and/or shortly before the pressing process is initiated).

In a concrete embodiment, the sensor device comprises a contact sensor which preferably has a movably mounted contact pin, which can further preferably be extended telescopically. The contact sensor can be located on and/or in the first punch. A "contact sensor" is in particular a sensor which allows a distance between the first and the second measuring element (in particular a change in the distance between the first and the second measuring element) to be determined by contact sensing. As an alternative to a contact sensor, a contactless sensor (such as an optical sensor) could also be used. However, a contact sensor can be used to reliably and robustly determine a position (or change of position) so that a high degree of measuring accuracy can be achieved with simple means.

Within the first and/or second punch (at least in sections), in particular within the second punch (at least in sections), an (in particular movable) center pin can be arranged. Within the first and/or second punch (at least in sections), in particular within the second punch (at least in sections), preferably within the center pin, an (in particular movable) measuring pin can be arranged. A recess in the pressed part can be easily created using a center pin of this type. In particular, if the measuring pin is arranged (at least in sections) within the center pin, an already intended structure can be easily used to arrange and accommodate the measuring pin. In general, a high accuracy of the measurement is achieved by an arrangement within the punch (especially in the case of even small inclinations or tilting of the punch).

The measuring pin can be moved via a preferably hydraulic and/or pneumatic and/or electric drive. In general, the measuring pin can be moved independently of the drive of the first and/or second plunger. Furthermore, the measuring pin may have a stop, which, in particular during the pressing process, can be brought into engagement with a corresponding stop of the second plunger and/or of the center pin. By providing such stops, it is possible to easily achieve a forced predetermined position of the measuring pin, so that the determination of the relative position between the first and second punch is particularly simple.

The center pin can have (at least) one, in particular slot-shaped, recess such that (at least) one stop element of the measuring pin penetrates the center pin so that the stop element of the measuring pin can strike against a stop of the second punch. This allows the relative position of the measuring pin and the corresponding punch to be fixed in a simple way. Nevertheless, the measuring pin remains principally movable relative to the punch (but can be arranged fixed in position or connected to it).

Preferably, the first measuring element is or can be arranged at least in sections within the first punch, preferably connected or connectable to an inner wall of the first punch. The second measuring element may or can be arranged at least in sections within the second punch, in particular connected or connectable to an inner wall of the second punch. Such an arrangement improves the accuracy of the measurement by simple means (in particular with regard to, albeit minimal, inclinations or tilting of the corresponding plunger).

The first and/or second punch for pressing the pressed part can be designed to be movable. The second punch can optionally remain fixed in position when pressing the pressed part.

Preferably, at least one control device, in particular a regulating device, is provided for controlling, in particular regulating, the movement of the first and/or second punch, in particular during a pressing operation. The control device can be connected to the measuring device wirelessly (e.g. via a radio connection) or via a signal line, so that measured values of the measuring devices can be further processed in the control device. This allows a precise regulation of the pressing process to be achieved. In general, the determination of a (travelled) distance of the first and/or the second punch (especially relative to each other) can be determined from the determination of the position. This can be carried out either already by the measuring device or by the above (or an additional) control device. In summary, the operation of the press device is simplified and at the same time a precise adjustment of the punches to each other is possible.

The first punch is preferably an upper punch. The second punch is preferably a lower punch.

The press device may preferably have at least two (preferably coaxially arranged) first punches, in particular upper punches, and/or at least two (preferably coaxially arranged) second punches, in particular lower punches. First and/or second measuring element is/are preferably arranged on and/or in the respective inner (preferably innermost) first punch or inner (preferably innermost) second punch. For example, if (at least) three upper and/or three lower punches are provided, the respective measuring element is preferably located in the innermost of the three punches (alternatively, it may also be located in the middle punch, which is an "inner" punch relative to the outermost punch).

Furthermore, at least two first punches, in particular upper punches, and/or at least two second punch, in particular lower punches, can be provided, wherein first and/or second measuring element is/are preferably arranged on and/or in the respectively longer (in particular respectively longest) first punch or longer (in particular longest) second punch. This compensates the length change described above particularly effectively.

The above object is further solved by a method for powder pressing a powder-pressed part, in particular a ceramic-powder pressed part and/or a metal-powder pressed part, using a press device of the type described above. The measuring device preferably measures a position of the first and/or second punch, in particular a relative position of the two punches relative to one another, and moves the first and/or second punch, in particular during pressing, as a function of this result. The measuring device or a control device (in particular the one described above) can be used to carry out a displacement measurement (i.e. position as a function of time) from the position measurement.

The above-mentioned object is solved in particular by using a press device of the type described above for powder pressing a powder-pressed part, in particular for pressing a ceramic-powder pressed part and/or metal-powder pressed part.

Further embodiments result from the subclaims.

BRIEF DESCRIPTION OF THE DRAWINGS

In the following, the invention is described by reference to embodiment examples, which are explained in more detail using the illustrations, wherein.

DETAIL DESCRIPTION OF THE PREFERRED EMBODIMENTS

In the following description, the same reference numbers are used for identical and equivalent parts.

Figure 1:
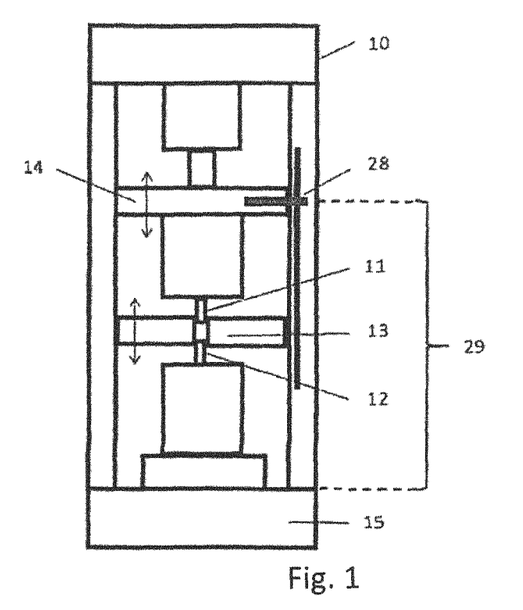
FIG. 1 shows a powder press according to a comparison example.

FIG. 1 shows a schematic view of a comparison example for a press device. This press device comprises a press frame 10 as well as an upper punch (first punch) 11 and a lower punch (second punch) 12. Between upper punch 11 and lower punch 12, powder for pressing a pressed part can be filled into a space delimited by a die 13. As in the following FIG. 2, only an upper punch 11 and a lower punch 12 are shown. However, several (especially coaxial, but possibly also non-coaxial) upper punches 11 and several (especially coaxial, but possibly also non-coaxial) lower punches 12 may be provided. As in DE 102 54 656 B4 or DE 10 2010 051 513 A1, for example, these can be moved and driven to and from the die and for pressing. Furthermore, a measuring device 28 is provided for measuring a position (and therefrom a path) of the upper punch. In concrete terms, a position on a punch base 14 is tapped off and measured with respect to a (lower) traverse 15, which has a distance 29 with respect to the punch base 14. The compression between punch base 14 and traverse 15 can be several millimeters (up to 3 mm if necessary), depending on the punch length. As a result, the actual punch position (or a position of a section of the punch coming into contact with the pressed part) can only be inaccurately determined. In particular, a compression (change in length) in the area between punch base 14 and traverse 15 cannot be detected. Resulting inaccuracies regarding the height of the pressed part can be within a range of up to ±0.06 mm. Another reason for poor process quality can be thermal influences, which can result in a length change of the punch of 0.1 to 0.2 mm. This is caused in particular by the heat generated at the punches by friction. These two phenomena are the main cause of production difficulties in powder pressing. In particular, due to these phenomena, it is only possible to produce the pressed parts (absolutely) crack-free, with as constant a density and partial height as possible, with great effort (with regard to calibration et cetera). With the solution shown in FIG. 1, a time-consuming readjustment and setting of the pressed parts is therefore carried out at the start of production, which requires a great deal of time.

Figure 2:
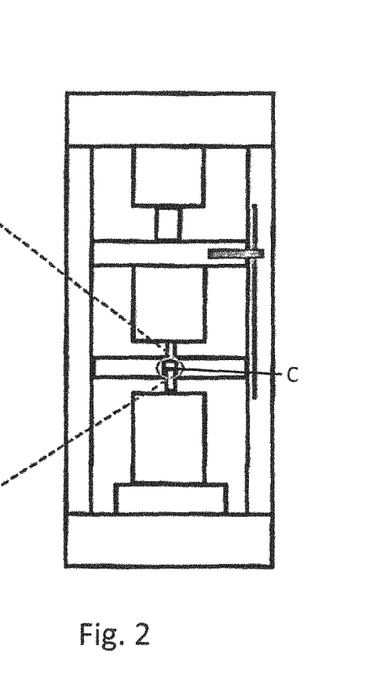
FIG. 2 shows a powder press according to a first embodiment example of the invention.

FIG. 2 shows a representation analogous to FIG. 1 with schematically sketched measuring device according to the invention. Details of the measurement of the position (or path) can be found in FIG. 3, which shows the section C in FIG. 2 on an enlarged scale.

Figure 3:
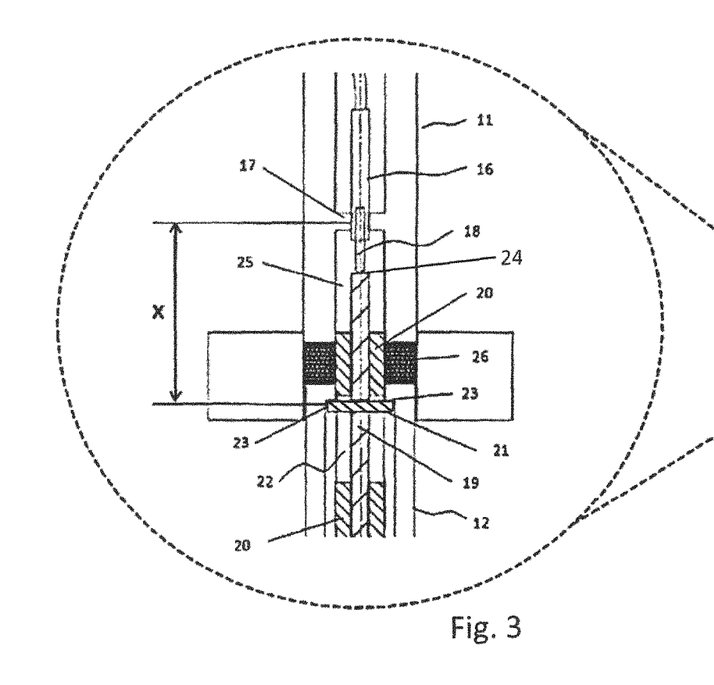
FIG. 3 shows a section of the embodiments according to FIG. 2 with individual details.

Compared to the comparison example given in FIG. 1, a position detection can be carried out (clearly) closer to the pressed part with the measuring device in accordance with the invention as shown in FIGS. 2 and 3 (which does not rule out that a measuring device 28 analogous to FIG. 1 is also provided here for a first positioning, so that the exact position may only be detected by the measuring element 16 described below shortly before the pressing position). The distance between the measuring points measured relative to each other (between which a compression or a change in length due to temperature differences can occur but cannot be measured) is smaller (many times) according to FIGS. 2 and 3 than with the system according to FIG. 1. This can enable an increase in accuracy (possibly by a factor of 10 or more or even by a factor of 20 or more).

According to FIG. 3, a first measuring element 16 is provided within the upper punch, which is firmly connected (at a first connection point 17) to the upper punch 11. A movable pin 18 is arranged on this first measuring element 16, which is assigned to a contact sensor. For this purpose (not shown in detail) a travel of the movable pin 18 relative to the first measuring element 16 can be calculated when approaching a second measuring element 19 (measuring pin)

(and from this an approach of the upper punch relative to the lower punch). The second element (measuring pin 19) is guided within a center pin 20. Stop elements 21 of the second measuring element 19 can be moved within slot-shaped recesses 22 of the center pin 20 so that it can strike (as shown in FIG. 3) against a corresponding stop 23 (which can be formed concretely by a step) of the lower punch 12. By enabling this stop, a predetermined relative position of the first end 24, facing the upper punch 11, of the second measuring element 19 relative to the lower punch 12 is known. Particularly in the press position, the lower punch 12 is connected to or in contact with the second measuring element 19 (fixed position).

The stop 23 is preferably formed by a stop edge. The stop elements 21 can be formed by radially protruding pins (cylindrical pins) and can strike against this edge. To accommodate the first measuring element 16, the upper punch 11 has a recess 25 (especially bore). As can be seen in FIG. 3, a distance X between the stop 23 in the lower punch 12 and the connection point 17 (fastening) of the first measuring element 16 in the upper punch 11 is comparatively small. Outside this range, a change in length of the punch due to compression and heating is compensated by the measurement per se. A pressed part 26 to be pressed is identified by the reference numeral 26.

Figure 4:
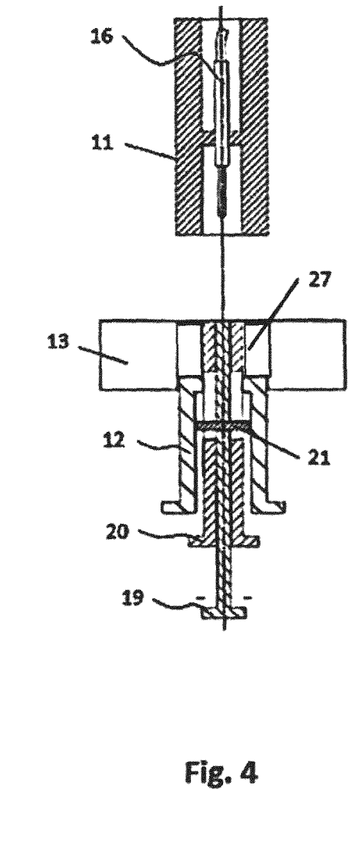
FIG. 4 shows the section according to FIG. 3 in the filling position.
Figure 5:
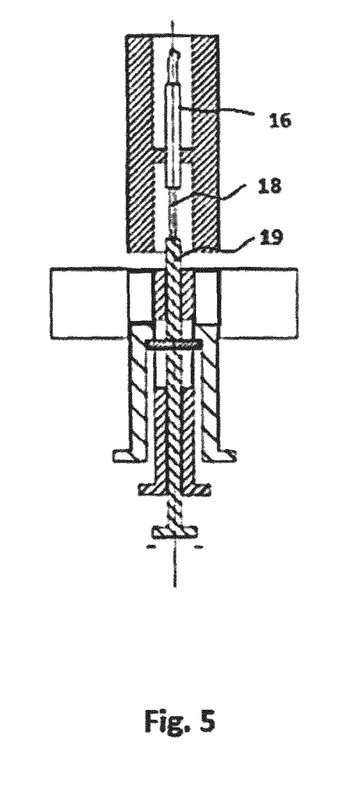
FIG. 5 shows the section according to FIG. 3 shortly before the start of pressing.

FIGS. 4 to 7 show a pressing cycle using the measuring device according to the invention. In the filling position as shown in FIG. 4, the second measuring element 19 (measuring pin) is flush with the center pin 20 and the die 13.

The second measuring element 19 (measuring pin 19) can be driven (moved) via a drive (possibly separately provided; possibly pneumatic and/or hydraulic and/or electric). This can be (permanently) attached to a drive of the center pin.

A height of the stop element 21 (i.e. a distance from one end facing the upper punch) can be configurably adjusted so that the relative position of the second measuring element relative to the center pin 20 can be varied.

After powder has been filled into a cavity 27 (see FIG. 4) within die 13, the upper punch 11 can move downwards. Before (especially shortly before) contact with the powder, a first contact can be made between the movable pin 18 and the second measuring element 19. The measuring pin can already be pressed (by the pneumatic drive) against the stop 23 of the lower plunger. From this point on, position determination (or position regulation with the aid of a signal from the measuring system) can be carried out (see FIG. 5).

Figure 6:
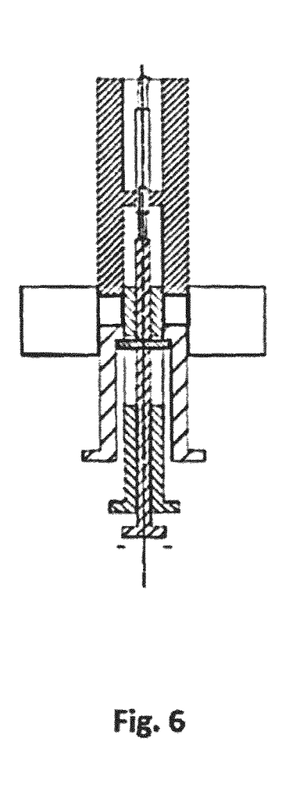
FIG. 6 shows the section according to FIG. 3 during pressing.
Figure 7:
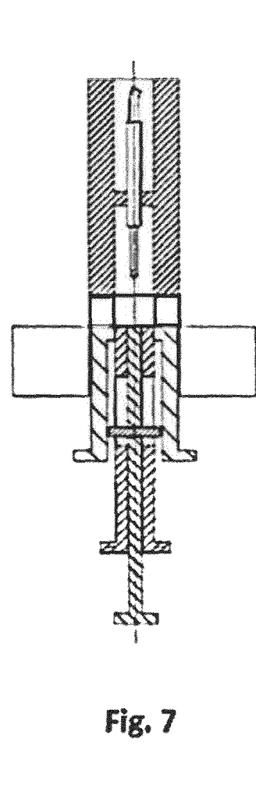
FIG. 7 shows the section according to FIG. 3 during demolding.

The powder is then compacted (see FIG. 6). Outside of the two measuring points (=stop edge of lower punch as well as fastening of the first measuring element), the compression or heating (with corresponding change in length) can be compensated.

When demolding (see FIG. 7), center pin 20 and measuring pin 19 can move downwards.

Overall, the measuring equipment as shown in FIGS. 2 to 7 can considerably reduce (or even eliminate) the time and effort required for setting up the system. Pressed part height and density can be kept constant throughout the (entire) process. The danger of cracks in the pressed part can be minimized.

Figure 8:
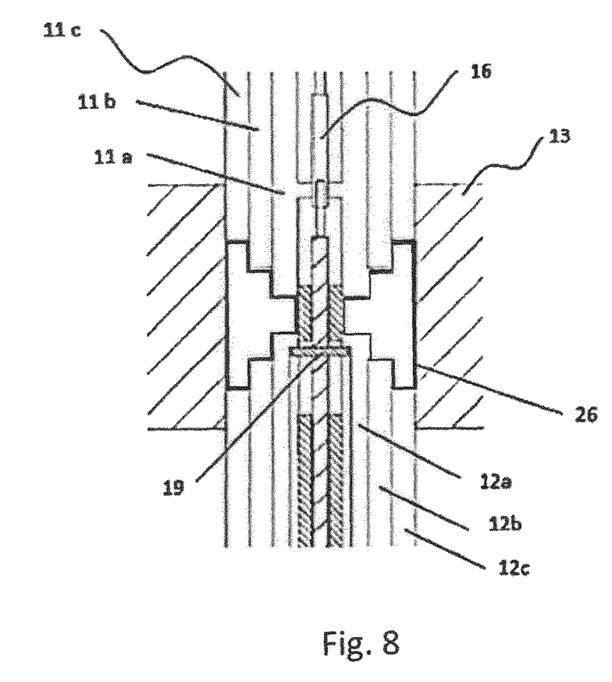
FIG. 8 shows the section according to FIG. 3 according to a modified embodiment of the press device (schematic)

FIG. 8 shows a modification of the embodiment according to FIG. 3 in a section analogous to FIG. 3. In addition to the embodiment according to FIG. 3, three (coaxial) upper punches 11a, 11b and 11c as well as three (coaxial) lower punches 12a, 12b, 12c are provided. In this embodiment, the measuring elements 16 and 19 are each arranged within the innermost (longest) punch 11a.

Figure 9:
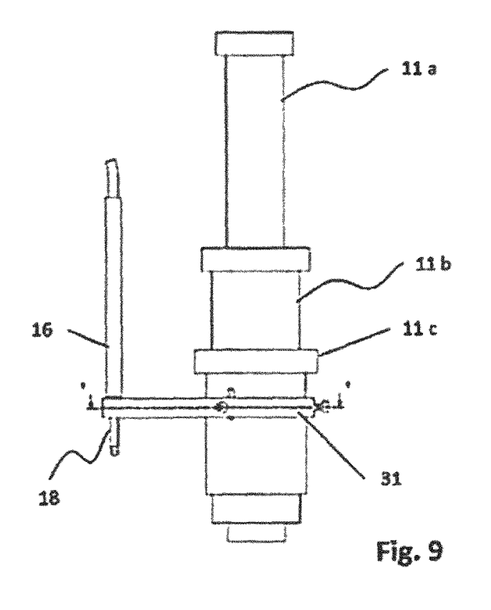
FIG. 9 shows a section of a second embodiment of the press device.
Figure 10:
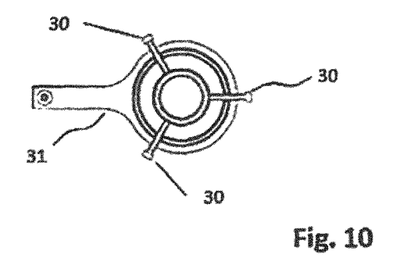
FIG. 10 shows a radial section through the embodiment according to FIG. 9.
Figure 11:
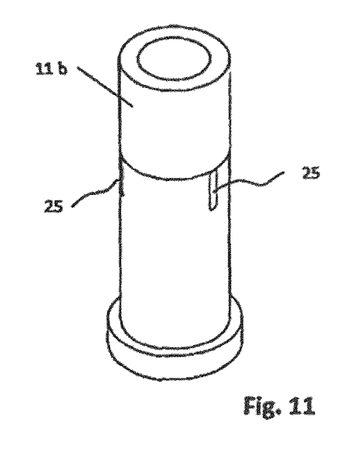
FIG. 11 shows a punch according to the embodiment according to FIG. 9.

FIGS. 9 to 11 show an alternative embodiment of the measuring device. Here the first measuring element 16 with the movable pin 18 is not arranged within an upper punch, but outside (all) upper punches 11a to 11b. The punches further out (11b, 11c, as shown in FIG. 11) are slotted for this purpose. The position can be transferred via screws 30 to an outer ring 31. The outer ring 31 is connected to the first measuring element 16 so that the position can be tapped. A corresponding structure is provided (not shown in detail in FIGS. 9 to 11) on the lower punch or the plurality of lower punches for this purpose, so that a relative position or a path which the upper punch travels relative to the lower punch (or the plurality of upper punches relative to the plurality of lower punches) can be measured (analogously to the embodiment according to FIGS. 2 to 8). Other connecting elements may be used instead of screws 30. These connecting elements need not be three, but can also be limited to one or two or be more than three. The outer ring 31 is also not necessarily mandatory. Preferably, however, at least one connecting element is provided, which is connected to one of the upper or lower punches (in particular to an inner or innermost lower or upper punch) and leads outwards and is specifically connected to the first measuring element. However, a comparatively reliable position of the first measuring element 16 can be guaranteed via the outer ring 31 and in particular in combination with several connecting elements (screws). Three upper punches are shown in the embodiment according to FIGS. 9 to 11. However, it is also possible to provide only one upper punch. Two, four or more upper punches may also be provided. Similarly, at least one lower punch, preferably at least two, more preferably at least three lower punches, may be provided. The recesses 25 shown in FIG. 11 do not necessarily have to be slotted.

Figure 12:
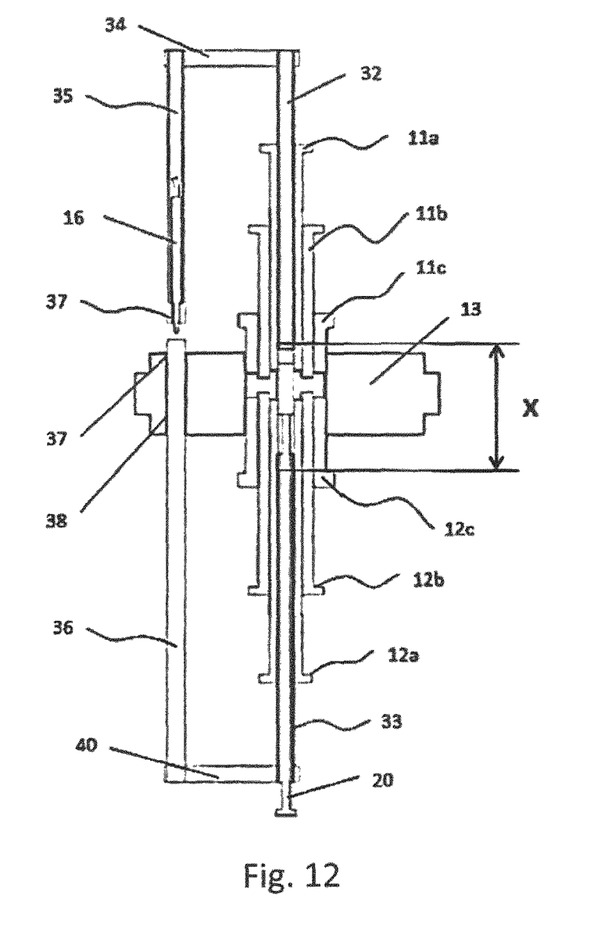
FIG. 12 shows a schematic view of another embodiment of the press device.

FIG. 12 shows a further embodiment of the press device according to the invention. Three upper punches 11a, 11b and 11c and three lower punches 12a, 12b and 12c are also shown here (however, the number of upper and lower punches in this context is not necessarily limited to three). Both the innermost upper punch 11a and the innermost lower punch 12a have a first tube 32 (soldered into the upper punch) and a second tube 33 (soldered into the lower punch). Via a first rod 34 (or other transmission element), the first tube (at an end of the tube remote from the second punch) is connected to a first transfer element 35 (which preferably extends parallel or antiparallel to the first tube 32). Analogously, one end of the second tube 33 facing away from the first punch is connected via a second rod (or other transmission element) to a second transmission element 36 (preferably extending parallel or antiparallel to the second tube 33). The ends 37 of the transmission elements 35, 36 facing each other can allow a position measurement. A movable pin (measuring element 16) is preferably arranged within the first transmission element 35 for this purpose. The second transmission element 36 (as shown in FIG. 12) can be passed through die 13 (especially a corresponding recess 38 within die 13). Tubes 32, 33 can also be designed differently (e.g. as rods or other transmission elements). In any case, one end of the first tube 32 facing the second punch may be fixed to the first punch (in particular the innermost first punch). Analogously, one end of the second tube (transmission element) facing the first punch can be firmly connected to one end of the second punch facing the first punch. The first rod 34 and/or second rod 35 may also concern any (especially radial) transmission elements.

Figure 13:
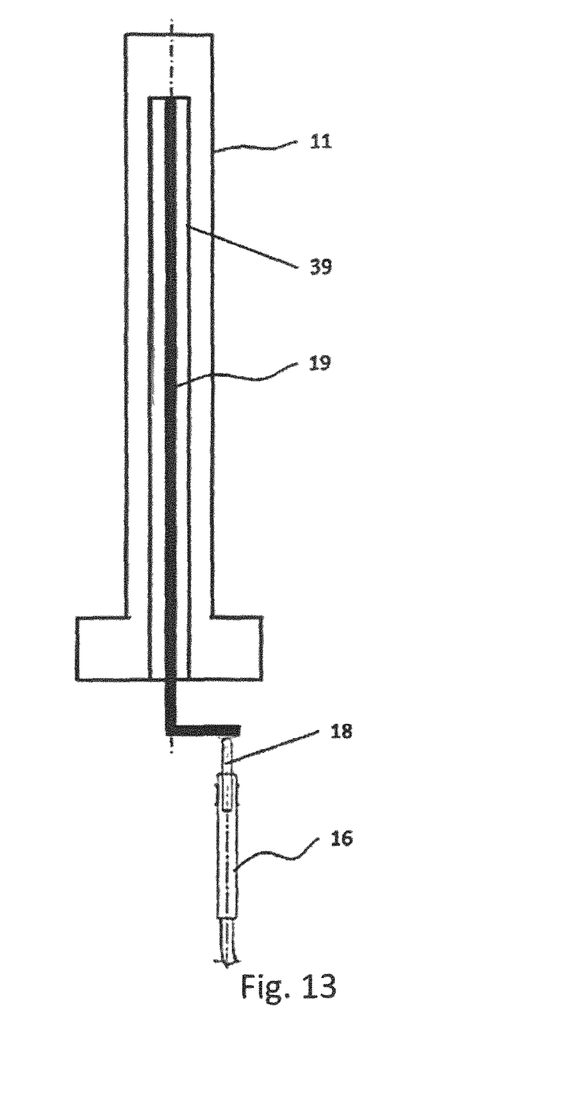
FIG. 13 shows a punch with measuring device according to another embodiment example of the press device.

FIG. 13 shows a further embodiment of a measuring device according to the invention. In this case, the measuring pin 19 is inserted in a recess 39 (bore) of a punch (e.g.

upper and/or lower punch). In particular, with the embodiment according to FIG. 13, a measuring pin 19, a measuring element 16 and a movable pin 18 are assigned to both the upper and lower punches. The measuring pin (especially at its end facing away from the other punch) is firmly connected to one punch (especially soldered into it). This measuring pin 19 can interact with a measuring element 16 and a movable pin 18, as described in the embodiment according to FIGS. 2 to 7.

At this point, it should be noted that all the parts described above are considered to be essential to the invention, as seen on their own and in any combination, in particular the details depicted in the drawings. The person skilled in the art is familiar with modifications to this.

LIST OF REFERENCE NUMERALS

X Distance
10 Press frame
11 Upper punch (first punch)
12 Lower punch (second punch)
13 Die
14 Punch base (movable traverse)
15 (Lower) traverse
16 First measuring element (sensor)
17 First connecting point
18 Movable pin
19 Second measuring element
20 Center pin
21 Stop element
22 (Slit-shaped) recess
23 Stop
24 End
25 Recess
26 Pressed part
27 Cavity
28 Measuring device
29 Distance
30 Screw
31 (Outer) ring
32 First tube
33 Second tube
34 First bar
35 First transmission element
36 Second transmission element
37 End
38 Recess
39 Recess
40 Second rod

The invention claimed is:

1. A metal-powder or ceramic-powder press device, comprising:
 a first punch, which, in a pressing position, is arranged to be immersible from a first side into a die opening of a die which is filled with ceramic or metal powder,
 at least one second punch, which, in the pressing position, is arranged to be immersible from a second side into the die opening of the die which is filled with ceramic or metal powder,
 a position measuring device for determining a position of the first punch, wherein the position measuring device comprises at least a first measuring element, a second measuring element, and
 a sensor device,
 wherein the first measuring element is connected or connectable to the first punch and the second measuring element is connected or connectable to the second punch;
 wherein a position of the measuring elements with respect to one another changes during the pressing operation, wherein the sensor device is designed to determine the change in the position of the measuring elements with respect to one another.

2. The A metal-powder or ceramic-powder press device, comprising
 at least one first punch, which, in a pressing position, is arranged to be immersible from a first side into a die opening of a die which is filled with ceramic or metal powder,
 at least one second punch, which, in the pressing position, is arranged to be immersible from a second side into the die opening of the die which is filled with ceramic or metal powder, and
 a position measuring device for determining a position of the first punch, wherein the position measuring device comprises at least one first measuring element and a sensor device for determining the position of the first measuring element,
 wherein the first measuring element is connected or connectable to the first punch, wherein the first measuring element is arranged or arrangeable at least in sections within the first punch, connected or connectable to an inner wall of the first punch.

3. Press device according to claim 1, comprising a first connection point between the first measuring element and the first punch lying in a half facing the die.

4. Press device according to claim 1, wherein
 the first measuring element is connected to the first punch by one of: joints, screws, or a clamping device, or the second measuring element is soldered to the second punch or the second measuring element is movable with respect to the second punch, and
 wherein the second measuring element is connectable to the second punch at least during the pressing operation in a positionally fixed manner, by engaging a stop of the second measurement device with a corresponding stop of the second punch.

5. Press device according to claim 1, wherein
 the sensor device comprises a contact sensor, which comprises a movably mounted contact pin that can further be extended telescopically, wherein the contact sensor is arranged on or in the first punch.

6. Press device according to claim 1, wherein
 a center pin is arranged within the second punch.

7. Press device according to claim 6, wherein the measuring pin is movable by: a hydraulic or pneumatic or electric drive, and the measuring pin is connectable to the second punch or the center pin at least during the pressing operation in a positionally fixed position by engaging a stop of the measuring pin with a corresponding stop of the second punch or the center pin.

8. Press device according to claim 1, wherein
 the first measuring element is arranged or arrangeable at least in sections within the first punch, is connected or connectable to an inner wall of the first punch, or the second measuring element is arranged or arrangeable at least in sections within the second punch, is connected or connectable to an inner wall of the second punch.

9. Press device according to claim 1, wherein the first punch or the second punch for pressing the pressed part is movable or the second punch remains in a fixed position when the pressed part is pressed.

10. Press device according to claim 1, wherein at least one regulating device, is provided for regulating movement of the first or the second punch during a pressing operation.

11. Press device according to claim 1, wherein the first punch is an upper punch or the second punch is a lower punch.

12. Press device according to claim 1, wherein at least two upper punches, or at least two lower punches, are provided, wherein a first measuring element is arranged on or in one of the following: a respective inner first punch or a longer first punch, wherein a second measuring element is arranged on or in one of the following: an inner second punch or a longer second punch.

13. Method for powder pressing a ceramic-powder pressed part or a metal-powder pressed part, using a press device according to claim 1.

14. Method according to claim 13, wherein a position of the two punches with respect to one another, is measured by the measuring device, and the first or second punch, during pressing, is moved as a function of a result measured.

15. A method of pressing with a press device according to claim 1, comprising powder pressing a ceramic-powder pressed part or metal-powder pressed part.

16. Press device according to claim 3, comprising a second connection point between the second measuring element and the second punch lying in a half facing the die.

17. Press device according to claim 1, wherein a measuring pin is arranged within the second punch, within the center pin.

18. Press device according to claim 6, wherein the center pin has at least one, slot-shaped, recess such that at least one stop element of the measuring is penetrable of the center pin wherein the stop element of the measuring pin is strikable against a stop of the second punch.

19. Press device according to claim 1, comprising at least two upper punches, and at least two lower punches, wherein first measuring elements are arranged on or in one of the following: a respective inner first punch or a longer first punch, and second measuring elements are arranged on or in one of the following: a respective inner or longer second punch.

* * * * *